United States Patent [19]

McTiffin

[11] Patent Number: 5,359,603
[45] Date of Patent: Oct. 25, 1994

[54] MOBILE RADIO SYSTEMS

[75] Inventor: Michael J. McTiffin, Winchester, England

[73] Assignee: Roke Manor Research Limited, Hampshire, England

[21] Appl. No.: 77,434

[22] Filed: Jun. 17, 1993

[30] Foreign Application Priority Data

Jun. 24, 1992 [GB] United Kingdom ............ 9213373.5

[51] Int. Cl.⁵ .............................................. H04J 3/02
[52] U.S. Cl. .................................. 370/94.1; 370/95.1
[58] Field of Search .................. 370/94.1, 94.2, 95.1, 370/60, 60.1; 455/33.1, 54.1, 56.1

[56] References Cited

U.S. PATENT DOCUMENTS 5,168,498 12/1992 Adams et al. .................... 370/94.1
5,195,090 3/1993 Bolliger et al. ...................... 370/60

Primary Examiner—Douglas W. Olms
Assistant Examiner—Min Jung
Attorney, Agent, or Firm—Hill, Steadman & Simpson

[57] ABSTRACT

An asynchronous transmission mode (ATM) system adapted for use with mobile terminals, the system comprising a mobile network interface unit connected to a network, a plurality of base stations connected to the network, and at least one mobile terminal arranged to communicate with the base stations over a radio link, the network being arranged to connect the mobile network interface unit and the base stations, said connections being defined by a virtual path identifier, a unique virtual channel identifier being allocated at set up of a call or connection by the mobile network interface unit, for identifying a call or connection associated with a mobile terminal being handled within an area controlled by the mobile network interface unit, the virtual channel identifier being placed in a virtual channel identifier field of ATM cell carrying user data associated with the call or connection.

2 Claims, 1 Drawing Sheet

MOBILE RADIO SYSTEMS

BACKGROUND OF THE INVENTION

The present invention relates to asynchronous transmission mode (ATM) mobile radio systems.

In mobile radio systems it is important that the radio spectrum be used efficiently. Known techniques by which this efficiency can be improved require that mobile terminals or units frequently change the base station or base stations to which they are affiliated (i.e., through which they communicate). This can impose stringent requirements on switching times in the fixed network infrastructure if breaks in communication due to reaffiliation are to be kept short. Typically, the network part of a mobile system consists of base stations connected to a mobile network interface unit (MNIU), which in turn is connected to a fixed network. The MNIU is the point of interconnection between the mobile network and the fixed network for as long as a call is being handled by one of the base stations in its area of responsibility.

It will be appreciated that the term "call" used throughout the specification also includes the set up of a connection, e.g., for signalling purposes.

In networks which use or handle ATM data, the data transmitted in such networks is subdivided into small packets of data, known as cells. The cells generally consist of 48 octets of user data and 5 octets of header information.

SUMMARY OF THE INVENTION

The present invention provides an asynchronous transmission mode (ATM) system in which a network within such a system is not required to take any action to support mobility of a mobile terminal within the area controlled by a mobile network interface unit.

To that end, in an embodiment, the invention provides an asynchronous transmission mode (ATM) system adapted for use with mobile terminals, the system comprising a mobile network interface unit connected to a network, a plurality of base stations connected to the network, and at least one mobile terminal arranged to communicate with the base stations over a radio link, the network being arranged to connect the mobile network interface unit and the base stations, the connections being defined by a virtual path identifier, a unique virtual channel identifier being allocated at set up of a call or connection by the mobile network interface unit for identifying a can or connection associated with a mobile terminal which is being handled within an area controlled by the mobile network interface unit, the virtual channel identifier being placed in a virtual channel identifier field of ATM cells carrying user data associated with the call or connection.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

As set forth above, the efficient operation of mobile systems having asynchronous transmission mode (ATM) networks require rapid changes in mobile affiliation. If such changes in affiliation were to require network switching the response times could be too long. An alternative technique is used whereby permanent virtual paths are set up across the ATM network between base stations within a defined area and the interface point of a fixed network. Within this area the virtual channel identifier (VCI) is given global significance and is used to designate the call. The ATM network may be replaced by a network of dedicated lines.

Figure 1:
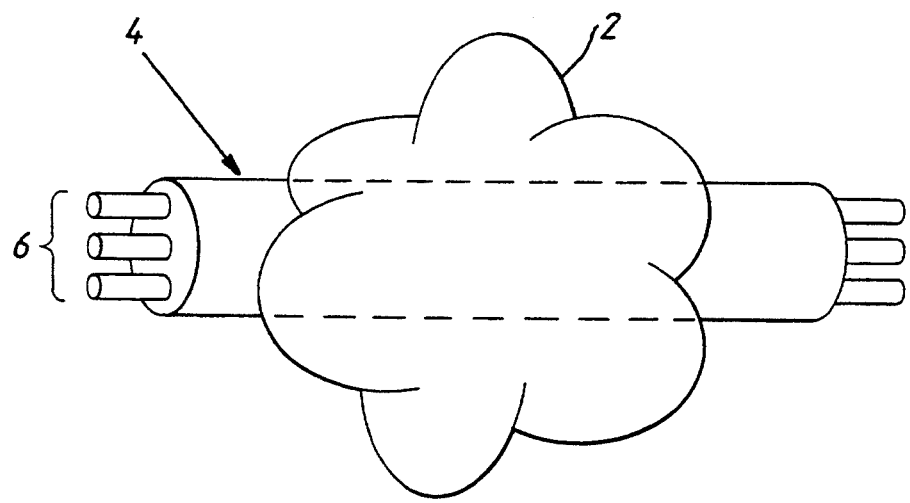
FIG. 1 illustrates a virtual path across an ATM network, and the virtual channels within the virtual path.

Referring first to FIG. 1, an ATM network 2 is illustrated having a virtual path 4 across the network. The virtual path 4 comprises a number of virtual channels 6. User data from individual transmission logical bursts is transported over the ATM network in one or more ATM cells. The data transported includes all types of information passing between the user and the network, including speech data.

Each ATM cell includes a header which contains control information including the virtual path identifier (VPI) and the virtual channel identifier (VCI). The virtual path identifier and the virtual channel identifier are held within fields. The two fields are used to route the cells across the ATM network.

The VPI is used to define a logical virtual path between two points in the network and in general there will be no direct physical connection between these two points. A virtual path will contain logical channels and the VCI value defines individual logic channels within the virtual path. The VCI only has significance within the virtual path and the same VCI value may be reused on other virtual paths. The switching node that routes on the basis of the VPI will never need to examine the VCI field.

The foregoing description represents the standard operation of an ATM network in accordance with CCITT Recommendations, e.g.:

I. 121 Broadband Aspects of ISDN;
I. 150 Broadband ATM Functional Characteristics CCITT Blue Book;
I. 211 Overall Network Aspects and Functions, ISDN User Network Interfaces;
I. 321 B-ISDN Protocol Reference Model and its Applications;
I. 361 B-ISDN ATM Layer Specification.

An explanation of the basic principles of ATM switching is given in a book entitled "Asynchronous Transfer Mode Solution for Broadband ISDN" by Martin de Prycker, published by Ellis Horwood 1991. ISBN 0-13-053513.3, the disclosure of which is incorporated herein by reference.

Figure 2:
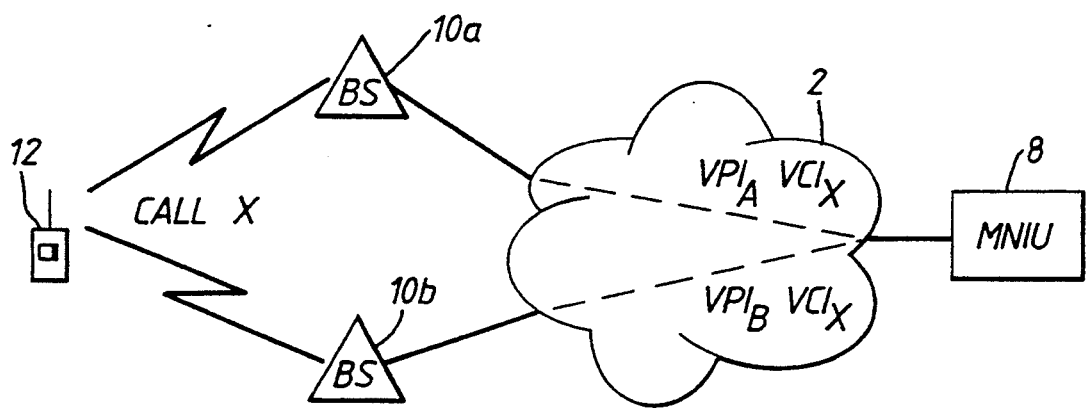
FIG. 2 illustrates an ATM system and the transmission paths between a mobile terminal and a mobile network interface unit.

The present invention as discussed now with reference to FIG. 2, redefines the VCI so that it identifies the call and gives that call global significance within the area of a particular mobile network interface unit. As already stated, switching nodes which route on the basis of the VPI field do not examine the VCI field, and therefore this use of the VCI field does not conflict with normal ATM network operation.

The connections between the mobile network interface unit 8 and the base stations 10a and 10b are redefined by the VPI. The call within the whole mobile network interface unit area is represented by the VCI which has global significance across all such VPI's. Each call in progress has a unique: VCI allocated by the mobile network interface unit 8 at the time the call is set up. The mobile network interface unit 8 can then identify the cell relating to a particular call by reference to the VCI alone.

The network is configured so that the mobile network interface unit 8 has a virtual path to each of the base stations 10a and 10b. In FIG. 2, a virtual path designated $VPI_A$ is illustrated connected to base station 10a, and a virtual path designated $VPI_B$ is illustrated connecting to base station 10b. These designations apply at the mobile network interface unit 8. Within the ATM network 2 the VPI may be translated resulting in different values being used at the base stations. Regardless of the values which are used, they relate to the same virtual path.

At the time the call to or from a mobile terminal 12 is set up, the call is allocated a unique VCI which is placed in the VCI field of all ATM cells carrying user data associated with that call from particular base station 10a or 10b to the mobile network interface unit 8, and from the mobile interface network unit 8 to the particular base station 10a or 10b. The same VCI will generally be used in both directions of transmission, but this is not essential. In FIG. 2, call X is allocated channel identifier $VCI_X$.

When the mobile terminal 12 is affiliated to a particular base station 10a or 10b, the user data is transmitted across the network using the VPI associated with the connection from that base station to the mobile network interface unit, and the VCI allocated at the time of call set up. When the mobile terminal 12 is affiliated to base station 10a, the path identifier $VPI_A$ and channel identifier $VCI_X$ are used, and when the mobile terminal 12 is affiliated to base station 10b, the path identifier $VPI_B$ and the channel identifier $VCI_X$ are used.

It will be seen from the above that no action is required by the ATM network to support mobility of the mobile terminal 12 within the area of the mobile network interface unit 8. Frequent and rapid reaffiliation of the mobile terminal is therefore possible, enabling a macrodiversity to be readily supported.

It will readily be appreciated by those skilled in the art, that while the above embodiment is described with reference to an ATM network, the invention is not limited thereto, the network could comprise dedicated lines by way of which ATM type data is transmitted.

Although modifications and changes may be suggested by those skilled in the art, it is the intention of the inventor to embody within the patent warranted hereon all changes and modifications as reasonably and properly come within the scope of his contribution to the art.

I claim:

1. An asynchronous transmission mode (ATM) system adapted for use with mobile terminals, said asynchronous transmission mode system comprising a mobile network interface unit connected to a network, a plurality of base stations connected to the network, and at least one mobile terminal arranged to communicate with the base stations over a radio link, the network being arranged to connect the mobile network interface unit and the base stations, said connections being defined by a virtual path identifier and a virtual channel identifier, and the virtual channel identifier being allocated at set up of a call or connection by the mobile network interface unit for identifying a stream of cells associated with a call or connection from a particular mobile terminal, the virtual channel identifier associated with the stream of cells remaining the same throughout the call or connection, even when the mobile terminal switches between different base stations.

2. The asynchronous transmission mode system as claimed in claim 1, wherein the network comprises a plurality of dedicated lines.

* * * * *